US008571111B2

(12) United States Patent
Levy et al.

(10) Patent No.: US 8,571,111 B2
(45) Date of Patent: Oct. 29, 2013

(54) METHOD AND APPARATUS FOR SWITCHING PROGRAM STREAMS USING A FIXED SPEED PROGRAM STREAM BUFFER COUPLED TO A DECODER

(75) Inventors: Paul Levy, Chandler, AZ (US); John Katausky, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1592 days.

(21) Appl. No.: 11/614,010

(22) Filed: Dec. 20, 2006

(65) Prior Publication Data

US 2008/0152312 A1    Jun. 26, 2008

(51) Int. Cl.
*H04N 7/00*    (2011.01)

(52) U.S. Cl.
USPC .................................................. 375/240.25

(58) Field of Classification Search
USPC ................................................ 386/347, 350
See application file for complete search history.

(56) References Cited

U.S. PATENT DOCUMENTS

| | | | |
|---|---|---|---|
| 7,058,053 B1 * | 6/2006 | Schober ........................ | 370/390 |
| 2002/0157099 A1 * | 10/2002 | Schrader et al. ............... | 725/51 |
| 2004/0003399 A1 * | 1/2004 | Cooper .......................... | 725/38 |
| 2004/0034863 A1 * | 2/2004 | Barrett et al. .................. | 725/38 |
| 2004/0160974 A1 | 8/2004 | Read et al. | |
| 2004/0255328 A1 | 12/2004 | Baldwin et al. | |
| 2005/0025453 A1 * | 2/2005 | Kimura .......................... | 386/46 |
| 2005/0094733 A1 | 5/2005 | Daniell | |
| 2006/0085828 A1 | 4/2006 | Dureau et al. | |
| 2006/0115088 A1 * | 6/2006 | Valentine et al. ............. | 380/270 |

FOREIGN PATENT DOCUMENTS

| | | |
|---|---|---|
| CN | 1298259 | 6/2001 |
| CN | 1484450 | 3/2004 |
| EP | 1675399 A2 | 6/2006 |
| WO | WO0057646 A1 | 3/2000 |
| WO | 2004114667 A1 | 12/2004 |
| WO | 2008079656 A1 | 7/2008 |

OTHER PUBLICATIONS

First Office Action mailed Dec. 3, 2010, European Patent Application No. 07869100.3, 6 pages.
Office Action mailed Mar. 27, 2011, Taiwan Patent Application No. 96144761. 13 pages.

(Continued)

*Primary Examiner* — Thai Tran
*Assistant Examiner* — Sunghyoun Park
(74) *Attorney, Agent, or Firm* — Kacvinsky Daisak PLLC

(57) ABSTRACT

Various embodiments for switching programs streams using a fixed speed program stream buffer coupled to a decoder are described. Various embodiments for switching programs streams using a fixed speed program stream buffer coupled to a decoder are described. In one or more embodiments, the fixed speed program stream buffer may be arranged to receive multiple program streams, such as video program streams, and to buffer historical frames comprising at least one anchor frame. Upon detecting a channel switch point, the most recent historical anchor frame prior to the channel switch point may be provided to the decoder. After receiving the anchor frame, the decoder may be arranged to start the next frame after the anchor frame instantly. Once the most recent historical anchor frame is played in to the decoder, the decoder may pick off the next frame after the anchor frame at a normal cadence. A program stream may be run in a delayed state by the decoder from an alternate channel buffer activated in response to a channel change. Other embodiments are described and claimed.

18 Claims, 3 Drawing Sheets

(56) References Cited

OTHER PUBLICATIONS

Office Action received for Chinese Patent Application No. 200780046908.4, mailed on Dec. 6, 2010, 6 pgs. including 3 pgs. English translation.

Office Action received for Chinese Patent Application No. 200780046908.4, mailed on Mar. 7, 2012, 7 pgs. including 3 pgs. English translation.

Office Action received for European Patent Application No. 07869100.3, mailed on Aug. 3, 2011, 5 pgs.

* cited by examiner

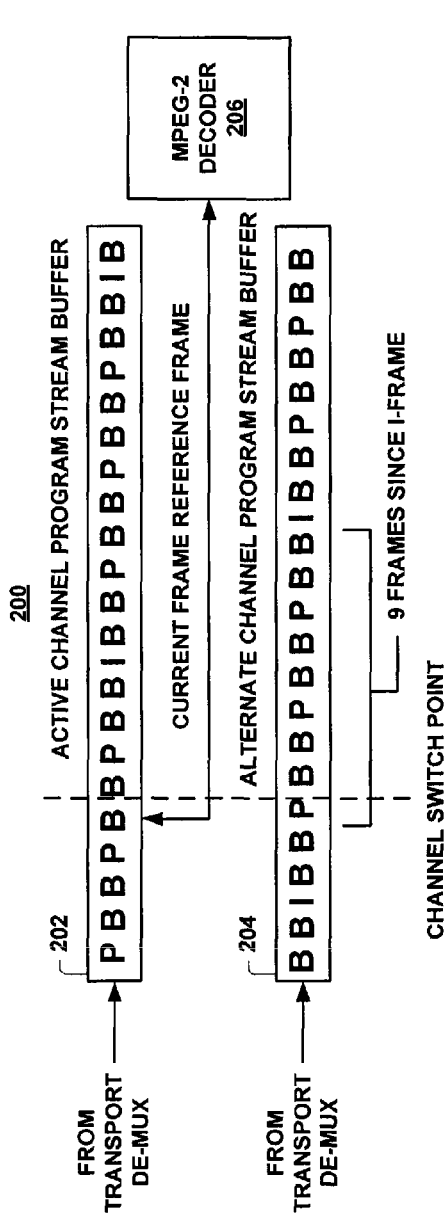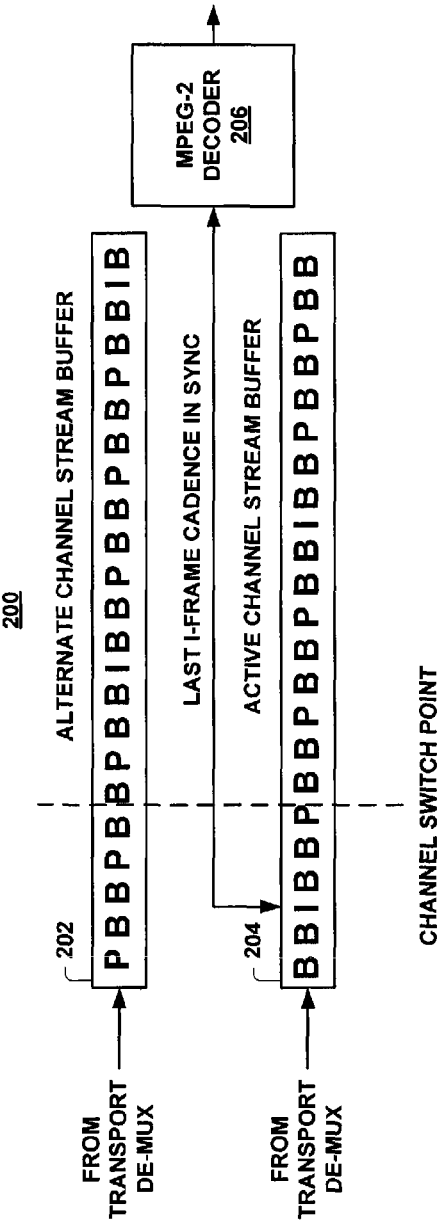

METHOD AND APPARATUS FOR SWITCHING PROGRAM STREAMS USING A FIXED SPEED PROGRAM STREAM BUFFER COUPLED TO A DECODER

RELATED APPLICATIONS

This application is related to co-pending U.S. patent application Ser. No. 11/614,000, titled Method and Apparatus for Switching Program Streams Using a Variable Speed Program Stream Buffer Coupled to a Variable Speed Decoder, which is being filed concurrently herewith and is incorporated by reference.

BACKGROUND

Long digital television (DTV) channel acquisition time yields a poor customer experience due to a significant delay when changing channels. Channel switch time delay may be caused by several factors such as radio frequency (RF) tuner frequency change, quadrature amplitude modulation (QAM) lock, symbol lock, packet identification (PID) decoding and program acquisition, intra-coding frame (I-frame) delay, video frame buffer build, and program selection lag. In some cases, a DTV device may experience over a one second delay when switching digital channels. During such delay, a blank or frozen screen is presented on the DTV device.

BRIEF DESCRIPTION OF THE DRAWINGS

FIGS. 2A and 2B illustrate a program stream switching apparatus in accordance with one or more embodiments.

DETAILED DESCRIPTION

Various embodiments for switching programs streams using a fixed speed program stream buffer coupled to a decoder are described. In one or more embodiments, the fixed speed program stream buffer may be arranged to receive multiple program streams, such as video program streams, and to buffer historical frames comprising at least one anchor frame. The fixed speed program stream buffer may be arranged to always comprise at least one anchor frame and may be implemented by running and/or elastic buffers corresponding to an active channel program stream and one or more alternate channel program streams.

Upon detecting a channel switch point, the most recent historical anchor frame prior to the channel switch point may be provided to the decoder. After receiving the anchor frame, the decoder may be arranged to start the next frame after the anchor frame instantly. Once the most recent historical anchor frame is played in to the decoder, the decoder may pick off the next frame after the anchor frame at a normal cadence. A program stream may be run in a delayed state by the decoder module from an alternate channel buffer activated in response to a channel change.

Figure 1:
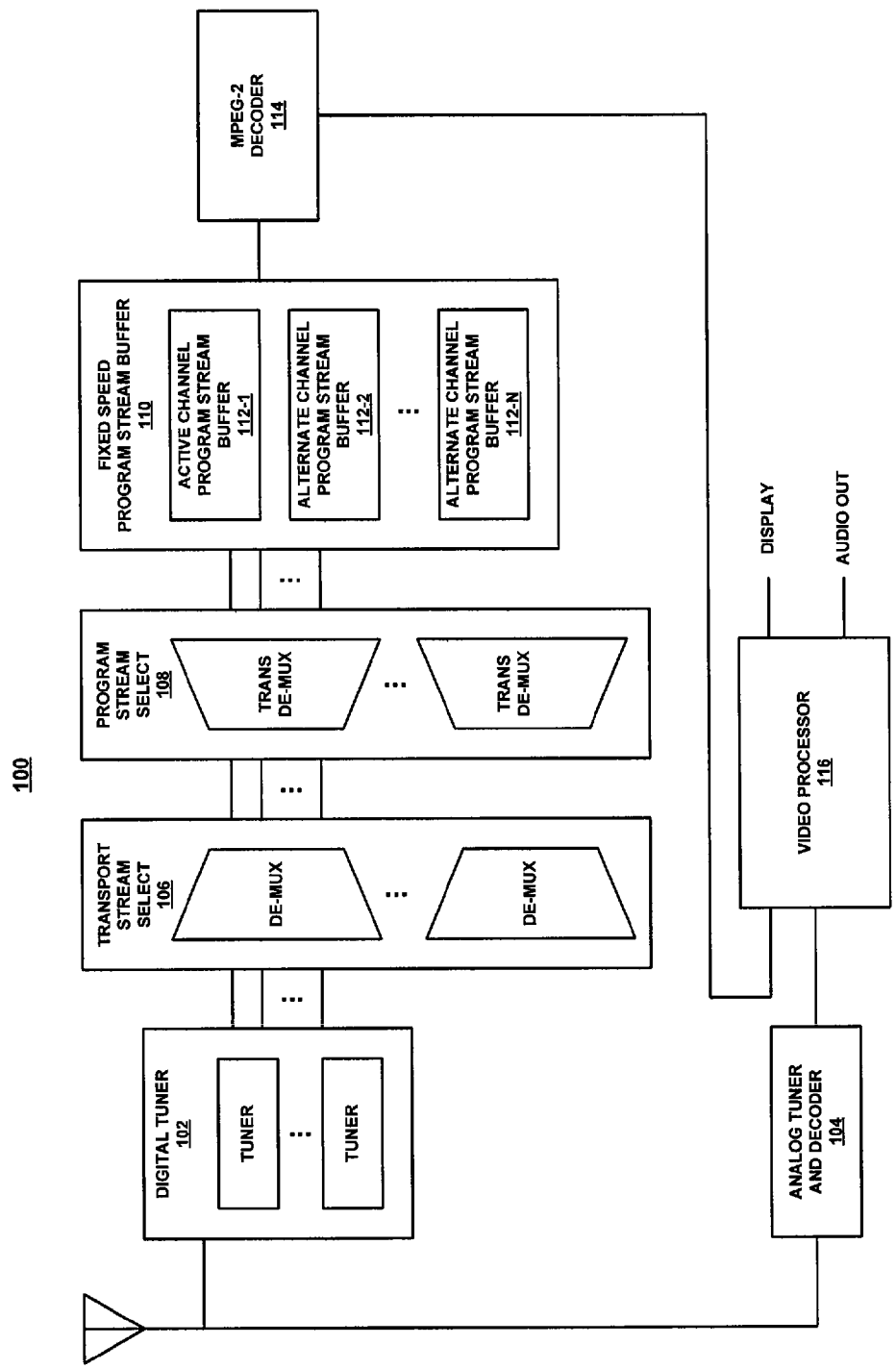
FIG. 1 illustrates a media system in accordance with one or more embodiments.

FIG. 1 illustrates a block diagram of a media system 100 in accordance with one or more embodiments. In general, the media system 100 may comprise various physical and/or logical components for communicating information which may be implemented as hardware, software, or any combination thereof, as desired for a given set of design parameters or performance constraints. Although FIG. 1 may show a limited number of components by way of example, it can be appreciated that a greater or a fewer number of components may be employed for a given implementation.

The media system 100 may be arranged to communicate one or more types of information, such as media information and control information. Media information generally may refer to any data representing content meant for a user, such as image information, video information, audio information, A/V information, graphical information, voice information, textual information, numerical information, alphanumeric symbols, character symbols, and so forth. Control information generally may refer to any data representing commands, instructions or control words meant for an automated system. For example, control information may be used to route media information through a system, or instruct a node to process the media information in a certain manner. The media and control information may be communicated from and to a number of different devices or networks. In various implementations, the media information and control information may be segmented into a series of packets. Each packet may comprise, for example, a discrete data set having a fixed or varying size represented in terms of bits or bytes. It can be appreciated that the described embodiments may be applicable to other types of communication content or format, such as packets, frames, fragments, cells, windows, units, and so forth.

In various embodiments, the media system 100 may form part of a wired communications system, a wireless communications system, or a combination of both. For example, the media system 100 may be arranged to communicate information over one or more types of wired communication links. Examples of a wired communication link, may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The media device 100 also may be arranged to communicate information over one or more types of wireless communication links. Examples of a wireless communication link may include, without limitation, a radio channel, satellite channel, television channel, broadcast channel infrared channel, radio-frequency (RF) channel, Wireless Fidelity (WiFi) channel, a portion of the RF spectrum, and/or one or more licensed or license-free frequency bands. Although certain embodiments may be illustrated using a particular communications media by way of example, it may be appreciated that the principles and techniques discussed herein may be implemented using various communication media and accompanying technology.

The media system 100 may be implemented within and/or connected to a device comprising one more interfaces and/or components for wireless communication such as one or more transmitters, receivers, transceivers, chipsets, amplifiers, filters, control logic, network interface cards (NICs), antennas, and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth.

The media system 100 may communicate information in accordance with one or more protocols and/or standards as promulgated by a standards organization, such as the International Telecommunications Union (ITU), the International Organization for Standardization (ISO), the International Electrotechnical Commission (IEC), the Institute of Electrical and Electronics Engineers (IEEE), the Internet Engineering Task Force (IETF), and so forth. In various embodiments, for example, the media system 100 may communicate information according to media processing standards such as, for example, the ITU/IEC H.263 standard (Video Coding for Low Bitrate Communication, ITU-T Recommendation H.263v3, published November 2000), the ITU/IEC H.264 standard (Video Coding for Very Low Bit Rate Communication, ITU-T Recommendation H.264, published May 2003), Motion Picture Experts Group (MPEG) standards (e.g., MPEG-1, MPEG-2, MPEG-4), Digital Video Broadcasting (DVB) terrestrial (DVB-T) standards, DVB satellite (DVB-S or -S2) standards, DVB cable (DVB-C) standards, DVB terrestrial for handhelds (DVB-H), National Television System Committee (NTSC) and Phase Alteration by Line (PAL) standards, Advanced Television Systems Committee (ATSC) standards, Society of Motion Picture and Television Engineers (SMPTE) standards such as the SMPTE 421M or VC-1 standard based on Windows Media Video (WMV) version 9, Digital Transmission Content Protection over Internet Protocol (DTCP-IP) standards, High performance radio Local Area Network (HiperLAN) standards, and so forth.

In one or more embodiments, the media system 100 may be implemented for a consumer electronics (CE) platform as a system within and/or connected to a device such as a set-top box (STB) device, television (TV) device, digital TV (DTV) device, high-definition TV (HDTV) device, direct broadcast satellite TV (DBS) device, video on-demand (VOD) device, Internet Protocol TV (IPTV) device, Web TV device, digital video recorder (DVR) device, digital versatile disc (DVD) device, high-definition DVD (HD-DVD) device, Blu-ray disc (BD) device, video home system (VHS) device, digital VHS device, entertainment system, media player, media appliance, audio/video (A/V) receiver, personal computer (PC), or any other suitable display device which is consistent with the described embodiments.

In various embodiments, the media system 100 may be arranged to receive media content from a media source. The media source generally may comprise various devices and/or systems capable of delivering static or dynamic media content to the media system 100. In one embodiment, for example, the media source may comprise or form part of a media distribution system (DS) or broadcast system such as an over-the-air (OTA) broadcast system, DVB system, radio broadcast system, satellite broadcast system, and so forth. In other embodiments, the media source may comprise a multimedia server arranged to provide broadcast or streaming media content. The media source may be implemented within a VOD system or interactive television system that allows users to select, receive, and view video content over a network. The media source also may comprise or form part of an IPTV system that delivers digital television content over an IP connection, such as a broadband connection. The embodiments are not limited in this context.

The media system 100 may be coupled to the media source through various types of communication channels capable of carrying information signals such as wired communication links, wireless communication links, or a combination of both, as desired for a given implementation. The media system 100 also may be arranged to receive media content from the media source through various types of components or interfaces. For example, the media system 100 may be arranged to receive media content through one or more tuners and/or interfaces such as one or more digital tuners, one or more analog tuners, an OpenCable (OC) tuner, an NTSC/PAL tuner, a tuner/demodulator, a point-of-deployment (POD)/ DVB common interface (DVB-CI), an A/V decoder interface, an Ethernet interface, a PCI interface, and so forth.

The media content delivered to the media system 100 may comprise various types of information such as image information, audio information, video information, A/V information, and/or other data. In some implementations, the media source may be arranged to deliver media content in various formats for use by a device such as an STB device, TV device, DTV device, HDTV device, DBS device, VOD device, IPTV device, Web TV device, DVR device, DVD device, HD-DVD device, BD device, VHS device, digital VHS device, entertainment system, media player, media appliance, A NV receiver, PC, display device, and so forth.

In various embodiments, media content may be delivered to the media system 100 as one or more transport streams and program streams. A transport stream may comprise, for example, an MPEG-2 transport stream as specified in ISO/IEC standard 13818-1:2000 Information Technology—Generic Coding of Moving Pictures and Associated Audio Information-Part 1: Systems. A transport stream also may comprise, for example, an ATSC transport stream for digital television as specified in ATSC standard A/90: Data Broadcast Standard—Amendment 1 and Corrigendum 1 and 2. In general, the ATSC Data Broadcast Standard defines protocols which are compatible with digital multiplex bit streams constructed in accordance with MPEG-2 (ISO/IEC 13818-1) systems.

A transport stream may comprise a sequence or bit stream comprising fixed-sized transport packets. For example, media content may be delivered by an MPEG-2 or ATSC transport steam as 188-byte transport packets. In some embodiments, each transport packet may be a fixed-size 188-byte packet comprising a payload and header information. The header information may include a packet identifier (PID) for stream differentiation or other information (e.g., sync byte, transport error flag, payload start flag, transport priority flag, scrambling control bits, adaptation field control bits, continuity counter bits) for identifying the contents of the packet. In some cases, error correction data also may be appended to the transport packet.

Each transport stream may comprise one or more program streams. For example, MPEG-2 and ATSC transport streams support multiple programs streams. The speed or bit rate of the transport stream may determine the number of programs that can be sustained. Because the transport stream may comprise fixed-size transport packets, the number of program streams sustainable the transport stream may depend upon the bit rate of the transport stream, which is independent of the size of the transport stream. That is, more content can be received for faster bit rates.

Each program stream may comprise audio, video, and/or data content. In some embodiments, the content of a program stream may be encoded or compressed to allow the media system 100 to efficiently store and transfer data. In various implementations, techniques such as spatial compression using discrete cosine transform (DCT), temporal compression, motion compensation, and quantization may be employed. Video compression may be performed, for example, in accordance with standards such as H.264, MPEG-2, MPEG-4, VC-1, and so forth. Audio compression may be performed, for example, in accordance with the Adaptive Transform Coder 3 (AC-3) or ATSC A/52 audio bitstream standard for DTV, DVDs, HDTV, and digital cable and satellite transmissions.

A transport stream may comprise a plurality of multiplexed program streams. For example, the transport stream may support the multiplexing of video and audio compressed streams from multiple programs with independent time bases. Accordingly, synchronization among program streams is not required, and program streams may be asynchronous to each other in real-time. A transport stream may comprise program streams representing one or more channels, such as television channels. Related program streams for a particular channel may be associated with each other by PIDs in the transport packets. A receiver may tune to a particular channel by decoding the payloads of transport packets having related PIDs and by discarding the contents of all other PIDs.

In various implementations, the transport stream may be modulated using Coded Orthogonal Frequency Division Multiplexing (COFDM) modulation, 8-level vestigial sideband (8VCB) modulation for ATSC, or other suitable modulation techniques to enable a transmitter and a tuner receive to communicate. In some cases, before decoding and de-multiplexing audio and video into constituent streams, the receiver may demodulate and apply error correction to the transport stream.

Although some embodiments may be described using MPEG-2 or ATSC transport streams and programs streams, it can be appreciated that various transport methods and/or program streams may be used consistent with the described embodiments. Further, while a particular type of communications network (e.g., ATSC, DTV, HDTV network) may be described, other types of communications networks may be used. Moreover, while some embodiments may be described for video content (e.g., ATSC, DTV, HDTV video content) it can be appreciated that other types of content may be implemented.

As illustrated in FIG. 1, the media system 100 may comprise a plurality of functional units or modules for receiving and processing one or more transport streams and/or program streams. In various embodiments, a functional unit or module may comprise hardware and/or software for performing one or more operations for the media system 100. For example, a module may comprise controller or other computing device arranged to execute logic implemented as software, code, and/or firmware. A module also may comprise memory implemented by one or more types of computer-readable storage media such as volatile or non-volatile memory, removable or non-removable memory, erasable or non-erasable memory, writeable or re-writeable memory, and so forth.

The media system 100 may comprise a digital tuner module 102 arranged to receive one or more transport streams. In one or more embodiments, the digital tuner module 102 may be arranged to decode multiple transport streams. In some implementations, a single digital tuner may be used for multiple program streams. In other implementations, multiple digital tuners may be used. In some cases, a tuner array comprising multiple digital tuners and/or the tuner module 104 and one or more analog tuners 104 may be implemented.

In some embodiments, the digital tuner module 102 may comprise multiple digital tuners sitting at different channels with one digital tuner set to an active channel and the other digital tuners set to alternate channels. For example, the digital tuner module 102 may comprise a three-tuner configuration to receive three transport streams and to tune to three channels based on local environment conditions. A primary tuner may be tuned to an active channel, a first alternate tuner may be tuned to a forward DTV channel, and a second alternate tuner may be tuned to a backward DTV channel. In some cases, the alternate tuners may position to up and down channels and/or to next and previous channels based on a channel map after a time delay. A four-tuner configuration may be implemented to cover channel up and down, jump (toggling) and return, next and previous channels based on channel map after a time delay, or heuristically position to up or down channels. A five-tuner configuration may be implemented to cover channel up and down, jump and return, jump chaining, and heuristic selection. Heuristic selection may involve prediction based on channel input, such as button 2 followed by 4 for channel 24 wherein two tuners are positioned to channel 23 and channel 24 as soon as the 2 is entered.

The media system 100 may comprise a transport stream select module 106. In one or more embodiments, the transport stream select module 106 may be coupled to the digital tuner module 102 and may be implemented by one or more de-multiplexers. The transport stream select module 106 may be arranged to select among multiple transport streams received from the digital tuner module 102 and to provide one or more transport streams as output.

The media system 100 may comprise a program stream select module 108. In one or more embodiments, the program stream select module 108 may be coupled to the transport stream select module 106 and may be implemented by one or more transport de-multiplexers. A transport de-multiplexer may be configured to receive a transport stream and to de-multiplex the transport stream to provide one or more program streams. For example, the transport de-multiplexer may separate an incoming multiplexed multi-program transport stream into several stand alone program streams (e.g., video streams, audio streams, data streams, etc.).

The transport stream select module 106 may be arranged to select and provide multiple programs streams as output. In one or more embodiments, the program stream select module 108 may select multiple program streams corresponding to an active channel and one or more alternate channels. An alternate channel may comprise, for example, a forward channel, a backward channel, an up channel, a down channel, a next channel, a previous channels (e.g., based on a channel map after a time delay), a jump (toggling) channel, a return channel, a predicted channel, a heuristically selected channel, and so forth.

In various embodiments, the transport stream select module 106 may be implemented by a plurality of de-multiplexers, and the program stream select module 108 may be implemented by a plurality of transport de-multiplexers. In such embodiments, the transport stream select module 106 and the program stream select module 108 may cooperate to enable cross-bar switching functionality to select one or more program streams from one or more transport streams.

The media system 100 may comprise a fixed speed program stream buffer module 110. The fixed speed program stream buffer module 110 may be coupled to the program stream select module 108 and may be implemented by a plurality of buffers 112-1-N, where N may represent any positive integer value consistent with the described embodiments. In various implementations, the number of buffers 112-1 employed may be designed to accommodate frequent switching from buffer to buffer that may occur when rapidly changing channels.

In one or more embodiments, each of the buffers 112-1-N may comprise, for example, one or more running (e.g., elastic) buffers corresponding to an active channel program stream and one or more alternate channel program streams. In some embodiments, the first buffer 112-1 and the second buffer 112-2 each may implemented by an MPEG-2 bitstream buffer and/or an AC-3 bitstream buffer, for example. At a particular point in time, the buffer 112-1 may comprise an active channel program stream buffer, and the buffer 112-2 may comprise an alternate channel program stream buffer. It can be appreciated that at a particular switch point (e.g., channel change) to the alternate channel, the buffers 112-1, 112-2 may reverse roles such that the first buffer 112-1 comprises an alternate channel program stream buffer and the second buffer 112-2 comprises the active channel program stream buffer.

In various implementations, the program streams received by the fixed speed program stream buffer module 110 and/or the buffers 112-1-N may comprise video streams, such as MPEG-2 encoded video streams. In such implementations, each of the program streams may comprise as a sequence of pictures, such as a group of pictures (GOP) or long GOP (LGOP). When encoded using MPEG-2, for example, each picture may be segmented into macroblocks, and the sequence of pictures may be implemented by three types of compressed frames: intra-coded frames (I-frames), predictive-coded frames (P-frames), and bi-directionally predictive-coded frames (B-frames). In some cases, the type of frame may be based on macroblock prediction. It can be appreciated that a picture may be further segmented into smaller regions (e.g., slices) and that prediction may be based on such regions.

When video is compressed using MPEG-2 or H.264 video compression, for example, encoding generally is performed for differences between pictures, such as for moving regions between pictures. For example, P-frames and B-frames take advantage of previously-decoded data in other reference frames to allow for more compression. For P-frames, macroblocks may be coded with forward prediction with reference to one or more previously-decoded frames. For B-frames, macroblocks may be coded with forward prediction with reference to one or more previous frames, backward prediction with reference to one or more future frames, and/or interpolated prediction with reference to one or more past and future frames. It is appreciated that while P-frames and B-frames allow for more compression, both P-frames and B-frames require the prior decoding of other reference frames in order to be decoded.

Unlike P-frames and B-frames, I-frames do not depend on previously-decoded data in past or future frames. For example, an I-frame may be coded without reference to any other frame except itself. An I-frame generally may comprise a compressed version of a single complete frame. For I-frames, all macroblocks may be coded without prediction. In various implementations, an I-frame may be used as a reference for the decoding of other frames (e.g., P-frames and B-frame) and may comprise an anchor frame or starting point for prediction after a channel switch is made. When received by a decoder, the I-frame may create a starting point to allow the decoder to begin decoding properly from the location of the I-frame.

Because I-frames generally require a larger number of bits, I-frames may be sent infrequently within a video stream. For example, there typically may be as many as 15 frames between I-frames in a GOP. Consequently, when decoding MPEG-2 video streams, there may be uncertainty as to the starting point for the decoder when frames are picked off the video stream after the channel is changed and demodulation begins. In some applications, there may be as much as a 500 ms delay to get an I-frame and begin proper decoding after a channel switch occurs. For example, refresh periods of a half-second are common in a DTV environment, and longer refresh periods may be experienced in some situations. This causes serious lag, and a blank or frozen screen is presented until an I-frame is detected.

In various embodiments, the fixed speed program stream buffer module 110 may be arranged to always comprise an anchor frame. In MPEG-2 or ATCS implementations, for example, the anchor frame may comprise an I-frame. For some implementations, each of the buffers 112-1-N of the fixed speed program stream buffer module 110 may be arranged to buffer at least 16 frames to ensure that at least one I-frame is stored at all times under typical conditions in which as many as 15 frames (e.g., P-frames, B-frames) occur between I-frames in a picture sequence (e.g., GOP). It can be appreciated that an anchor frame (e.g., I-frame) may be asynchronous and moving with respect to time. The buffers 112-1-N may comprise running and/or elastic buffers with the number of frames varying over time, while always containing at least one anchor frame (e.g., I-frame).

In one or more embodiments, the anchor frame (e.g., I-frame) may be stored in the fixed speed program stream buffer module 110 within one or more alternate channel program stream buffers (e.g., buffer 112-2-N). Accordingly, the anchor frame may be readily accessible upon detection of a program stream switch (e.g., channel change).

The fixed speed program stream buffer module 110 may be coupled to a decoder module 114. The decoder module 114 may be implemented, for example, by one or more decoders, such as one or more MPEG-2 decoders and/or one or more AC-3 decoders. In various implementations, the fixed speed program stream buffer module 110 may be arranged to present the most recent historical anchor frame (e.g., I-frame) to the decoder module 114.

In one or more embodiments, a switch from an active channel program stream to an alternate channel program stream is performed when a channel change occurs. Upon detecting the change or switch, the fixed speed program stream buffer module 110 may be arranged to provide or play in to the decoder module 114 the most recent historical anchor frame (e.g., I-frame) prior to the channel switch point. The fixed speed program stream buffer module 110 may implement a history buffer comprising historical frames received prior to the channel switch point (e.g., channel change).

The fixed program stream buffer module 110 may be arranged to always start at the most recent historical anchor frame (e.g., I-frame). For example, the fixed speed program stream buffer module 110 may comprise a start pointer that always points to the most recent historical anchor frame (e.g., I-frame) whenever the program stream is activated. In effect, the start pointer is moved back in time to start at the most recent historical anchor frame (e.g., I-frame).

Upon receiving the most recent historical anchor frame (e.g., I-frame), the decoder module 114 may be arranged to start the next frame after the anchor frame instantly. In one or more embodiments, after the anchor frame (e.g., I-frame) is played in to the decoder module 110, the decoder module 110 may begin picking off the next frame after the anchor frame at a normal cadence. Cadence synchronization may be achieved by stretching the next frame (e.g., video frame).

The decoder module 114 may be arranged to run at a standard time cadence beginning with the most recent historical anchor frame (e.g., I-frame). When a switch is made from an active channel to an alternate channel, the fixed program stream buffer module 110 may point to the anchor frame (e.g., I-frame), and the decoder module 114 may start playing from the anchor frame at a normal time rate. Following the channel change or switch point, the decoder module 114 may be arranged to always play historical frames from the fixed speed program stream buffer module 110 as a delayed program stream. For example, a program stream may be run in a delayed state by the decoder module 114 from an alternate channel buffer (e.g., buffer 112-2) activated in response to a channel change. The delay may be constant and may depend on the number of frames since the last anchor frame.

The media system 100 may comprise a video processing module 116. The video processing module 116 may be coupled to the decoder module 114 to perform various back-end processing operations within the media system 100 for rending, displaying, and/or playing media content on a display such as a screen or other user interface (UI). In various embodiments, the video processor module 116 may be arranged to receive a video stream (e.g., ATSC, DTV, HDTV video stream) from the decoder module 114 and to perform video and/or audio processing operations for de-interlacing, image enhancement, vertical blanking interval (VBI) processing, teletext, closed captioning, scaling, picture-in-picture (PiP), on screen display (OSD), color control, display interfacing, low voltage differential signaling (LVDS), and so forth.

FIGS. 2A and 2B illustrate a program stream switching apparatus 200 in accordance with one or more embodiments. For purposes of illustration, and not limitation, an exemplary implementation will be described with reference to FIGS. 2A and 2B. In this implementation, the program streams may comprise MPEG-2 video program streams including a sequence of pictures including I-frames, P-frames, and B-frames. The embodiments are not limited in this context.

As shown, the program stream switching apparatus 200 may comprise a first fixed speed program stream buffer (first buffer) 202 and a second fixed speed program buffer (second buffer) 204 arranged to receive MPEG-2 video program streams from a transport de-multiplexer and coupled to a MPEG-2 decoder 206. In FIG. 2A, the first buffer 202 comprises an active channel program stream buffer feeding content to the MPEG-2 decoder 206. The second buffer 204 comprises an alternate channel program stream buffer for buffering an alternate channel program stream. Each of the buffers 202, 204 may comprise at least sixteen frames including at least one I-frame at all times. It can be appreciated that the I-frames are not synchronized. At a time immediately preceding a channel switch point, a B-frame is sent from the first buffer 202 (e.g., active channel program stream buffer) to the MPEG-2 decoder 206.

In FIG. 2B, at the time of a channel change, a switch is made from the first buffer 202 to the second buffer 204 such that the first buffer 202 comprises an alternate channel program stream buffer, and the second buffer 204 comprises the active channel program stream buffer. As shown, the most recent historical I-frame is sent to the MPEG-2 decoder 206.

Upon receiving the I-frame, the MPEG-2 decoder may be arranged to start the next frame instantly. For example, after the I-frame is played in to the MPEG-2 decoder 206, the MPEG-2 decoder 206 may be arranged to pick-off the next frame (e.g., B-frame) after the I-frame at a standard cadence. Cadence synchronization may be achieved by stretching the next frame (e.g., B-frame).

The MPEG-2 decoder 206 may be arranged to run at a standard time cadence beginning with the most recent historical I-frame. When a switch is made from an active channel to an alternate channel, the second buffer 204 may point to the I-frame, and the MPEG-2 decoder 206 may start playing from the I-frame at a normal time rate. Following the channel change or switch point, the MPEG-2 decoder 206 may be arranged to play historical frames from the second buffer 204 as a delayed program stream. For example, the program stream may be run in a delayed state by the MPEG-2 decoder 206 from the second buffer 204 activated in response to a channel change. The delay may be constant and may depend on the number of frames since the last anchor frame.

Operations for various embodiments may be further described with reference to the following figures and accompanying examples. Some of the figures may include a logic flow. It can be appreciated that an illustrated logic flow merely provides one example of how the described functionality may be implemented. Further, a given logic flow does not necessarily have to be executed in the order presented unless otherwise indicated. In addition, a logic flow may be implemented by a hardware element, a software element executed by a processor, or any combination thereof. The embodiments are not limited in this context.

Figure 3:
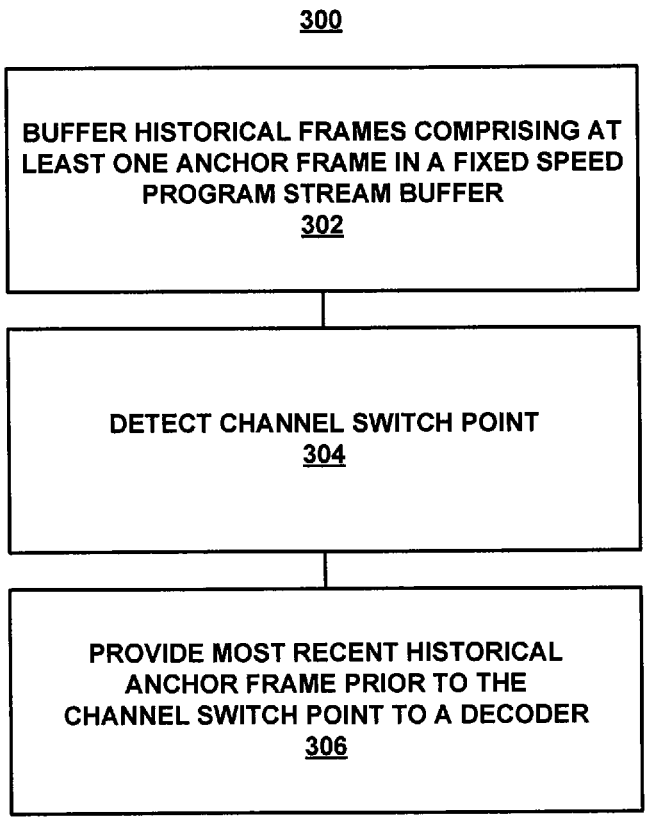
FIG. 3 illustrates a logic flow for switching program streams in accordance with one or more embodiments.

FIG. 3 illustrates one embodiment of a logic flow 300 for switching program streams. The logic flow 300 may be implemented, for example, by one or more elements of the media system 100 illustrated in FIG. 1 and/or the program stream switching apparatus 200 illustrated in FIGS. 2A and 2B. The embodiments are not limited in this context.

In various embodiments, the logic flow 300 may be performed by various systems, devices, units, and/or components and may be implemented as hardware, software, and/or any combination thereof, as desired for a given set of design parameters or performance constraints. For example, the logic flow 300 may be implemented by one or more logic devices and/or logic comprising instructions, data, and/or code to be executed by a logic device.

The logic flow 300 may comprise buffering historical frames comprising at least one anchor frame in a fixed speed program stream buffer (block 302). In one or more embodiments, the fixed speed program stream buffer may be arranged to always comprise at least one anchor frame, such as an I-frame. The historical frames may be buffered from one or more programs streams, such as MPEG-2 video program streams. The fixed speed program stream buffer may comprise one or more running (e.g., elastic) buffers corresponding to an active channel program stream and one or more alternate channel program streams. The anchor frame (e.g., I-frame) may be buffered by an alternate channel program stream buffer.

The logic flow 300 may comprise detecting a channel switch point (block 304) and providing the most recent historical anchor frame prior to the channel switch point to a decoder (block 306). In one or more embodiments, upon receiving the most recent historical anchor frame (e.g., I-frame), the decoder may be arranged to start the next frame after the anchor frame instantly. After the anchor frame (e.g., I-frame) is played in to the decoder, the decoder may begin picking off the next frame after the anchor frame at a normal cadence. Following the channel change or switch point, the decoder may be arranged to always play historical frames from the fixed speed program stream buffer as a delayed program stream.

Figure 4:
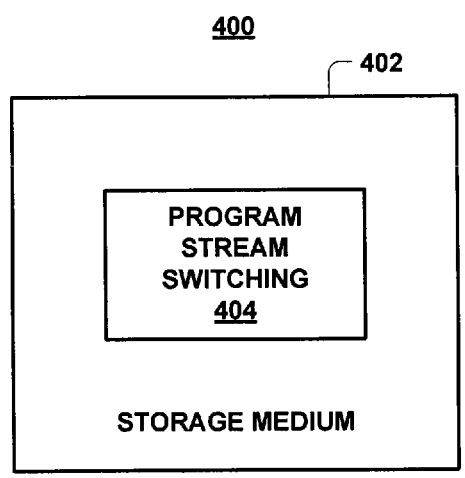
FIG. 4 illustrates an article of manufacture comprising program stream switching logic in accordance with one or more embodiments.

FIG. 4 illustrates one embodiment of an article of manufacture 400. As shown, the article 400 may comprise a storage medium 402 to store program stream switching logic 404 for performing various operations in accordance with the described embodiments. In various embodiments, the article 400 may be implemented by various systems, components, and/or modules.

The article 400 and/or storage medium 402 may include one or more types of computer-readable storage media capable of storing data, including volatile memory or, non-volatile memory, removable or non-removable memory, erasable or non-erasable memory, writeable or re-writeable memory, and so forth. Examples of a computer-readable storage medium may include, without limitation, random-access memory (RAM), Dynamic RAM (DRAM), Synchronous DRAM (SDRAM), Double-Data-Rate RAM (DDR RAM), DDR SDRAM, static RAM (SRAM), read-only memory (ROM), programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other type of computer-readable storage media suitable for storing information.

The article 400 and/or storage medium 402 may store program stream switching logic 404 comprising instructions, data, and/or code that, if executed, cause a computer or computer system to perform a method and/or operations in accordance with the described embodiments. Such a computer or computer system may include, for example, any suitable processing platform, computing platform, computing device, processing device, computing system, processing system, processor, or the like, and may be implemented using any suitable combination of hardware and/or software.

The program stream switching logic 404 may comprise, or be implemented as, software, a software module, an application, a program, a subroutine, instructions, an instruction set, computing code, words, values, symbols or combination thereof. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
a display;
a digital tuner module to decode multiple transport streams, the digital tuner module comprising a primary tuner to tune to an active channel, and one or more alternate tuners to tune to one or more alternate channels;
a fixed speed program stream buffer module coupled to a decoder module to display media content on the display running at a normal cadence, the fixed speed program stream buffer module to buffer historical frames comprising at least one anchor frame and to provide a most recent historical anchor frame prior to a detected channel switch point to the decoder module, the fixed speed program stream buffer module comprising an active channel program stream buffer to buffer historical frames of an active channel program stream corresponding to the active channel, one or more alternate channel program stream buffers to buffer historical frames of one or more alternate channel program streams corresponding to the one or more alternate channels, and a start pointer that points to the most recent historical anchor frame, the decoder module to stretch a next frame after the most recent historical anchor frame to synchronize to the normal cadence for display on the display, the active channel program stream buffer and the one or more alternate channel program stream buffers comprising elastic buffers to store a number of historical frames that varies over time; and a processor implementing at least one of the digital tuner module, the fixed speed program stream buffer module, or the decoder module.

2. The apparatus of claim 1, the fixed speed program stream buffer module to always comprise at least one anchor frame.

3. The apparatus of claim 1, the anchor frame comprising an intra-coded frame (I-frame).

4. The apparatus of claim 1, the decoder module comprising at least one of a video decoder and an audio decoder.

5. The apparatus of claim 1, the decoder module to pick off the next frame from the fixed speed program stream buffer module for display on the display at the normal cadence and to run a program stream from the fixed speed program stream buffer module in a delayed state.

6. A system, comprising:
a media source;
a program stream switching apparatus to couple to the media source, the program stream switching apparatus comprising:
a display;
a digital tuner module to decode multiple transport streams, the digital tuner module comprising a primary tuner to tune to an active channel, and one or more alternate tuners to tune to one or more alternate channels;
a fixed speed program stream buffer coupled to a decoder to display media content on the display running at a normal cadence, the fixed speed program stream buffer to buffer historical frames comprising at least one anchor frame and to provide a most recent historical anchor frame prior to a detected channel switch point to the decoder, the fixed speed program stream buffer comprising an active channel program stream buffer to buffer historical frames of an active channel program stream corresponding to the active channel, one or more alternate channel programs stream buffers to buffer historical frames of one or more alternate channel program streams corresponding to the one or more alternate channels, and a start pointer that points to the most recent historical anchor frame, the decoder to stretch a next frame after the most recent historical anchor frame to synchronize to the normal cadence for display on the display, the active channel program stream buffer and the one or more alternate channel program stream buffers comprising elastic buffers to store a number of historical frames that varies over time.

7. The system of claim 6, the fixed speed program stream buffer to always comprise at least one anchor frame.

8. The system of claim 6, the anchor frame comprising an intra-coded frame (I-frame).

9. The system of claim 6, the decoder comprising at least one of a video decoder and an audio decoder.

10. The system of claim 6, the decoder to pick off the next frame from the fixed speed program stream buffer for display on the display at the normal cadence and to run a program stream from the fixed speed program stream buffer in a delayed state.

11. A method, comprising:
buffering historical frames of an active channel program stream, comprising at least one anchor frame of the active channel program stream, in an active channel program stream buffer coupled to a decoder to display media content on a display running at a normal cadence, the active channel program stream buffer comprising an elastic buffer, the active channel program stream corresponding to an active channel tuned by a primary tuner;
buffering historical frames of one or more alternate channel program streams, comprising at least one anchor frame of the one or more alternate channel program streams, in one or more alternate channel program stream buffers coupled to the decoder, the one or more alternate channel program stream buffers comprising elastic buffers to store a number of historical frames that varies over time, the one or more alternate channel program streams corresponding to one or more alternate channels tuned by one or more alternate tuners;
adjusting a start pointer to point to the most recent historical anchor frame;
detecting a channel switch point;
providing a most recent historical anchor frame prior to the channel switch point to the decoder using the start pointer; and
stretching a next frame after the most recent historical anchor frame to synchronize to the normal cadence for display on the display.

12. The method of claim 11, further comprising always buffering at least one anchor frame.

13. The method of claim 11, the anchor frame comprising an intra-coded frame (I-frame).

14. The method of claim 11, further comprising:
picking off the next frame from the fixed speed program stream buffer for display on the display at the normal cadence; and
running a program stream from the fixed speed program stream buffer in a delayed state.

15. An article comprising a non-transitory computer-readable storage medium containing instructions that if executed enable a system to:
buffer historical frames of an active channel program stream, comprising at least one anchor frame of the active channel program stream, in an active channel program stream buffer coupled to a decoder to display media content on a display at a normal cadence, the active channel program stream buffer comprising an elastic buffer, the active channel program stream corresponding to an active channel tuned by a primary tuner;
buffer historical frames of one or more alternate channel program streams, comprising at least one anchor frame of the one or more alternate channel program streams, in one or more alternate channel program stream buffers coupled to the decoder, the one or more alternate channel program stream buffers comprising elastic buffers to store a number of historical frames that varies over time, the one or more alternate channel program streams corresponding to one or more alternate channels tuned by one or more alternate tuners;
adjust a start pointer to point to the most recent historical anchor frame;
detect a channel switch point;
provide a most recent historical anchor frame prior to the channel switch point to the decoder using the start pointer; and
stretch a next frame after the most recent historical anchor frame to synchronize to the normal cadence for display on the display.

16. The article of claim 15, further comprising instructions that if executed enable the system to always buffer at least one anchor frame.

17. The article of claim 15, the anchor frame comprising an intra-coded frame (I-frame).

18. The article of claim 15, further comprising instructions that if executed enable the system to:
- pick off the next frame from the fixed speed program stream buffer for display on the display at the normal cadence; and
- run a program stream from the fixed speed program stream buffer in a delayed state.

* * * * *